United States Patent
Schreiber et al.

(10) Patent No.: US 9,495,115 B2
(45) Date of Patent: Nov. 15, 2016

(54) AUTOMATIC ANALYSIS OF ISSUES CONCERNING AUTOMATIC MEMORY MANAGEMENT

(71) Applicants: Steffen Schreiber, Frankenthal (DE); Johannes Scheerer, Heidelberg (DE); Ralf Schmelter, Wiesloch (DE); Dietrich Mostowoj, Ludwigshafen am Rhein (DE); Thomas Klink, Moerlenbach (DE); Matthias Braun, Illingen (DE)

(72) Inventors: Steffen Schreiber, Frankenthal (DE); Johannes Scheerer, Heidelberg (DE); Ralf Schmelter, Wiesloch (DE); Dietrich Mostowoj, Ludwigshafen am Rhein (DE); Thomas Klink, Moerlenbach (DE); Matthias Braun, Illingen (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 14/504,209

(22) Filed: Oct. 1, 2014

(65) Prior Publication Data
US 2016/0098229 A1 Apr. 7, 2016

(51) Int. Cl.
*G06F 12/00* (2006.01)
*G06F 3/06* (2006.01)

(52) U.S. Cl.
CPC ........... *G06F 3/0652* (2013.01); *G06F 3/0608* (2013.01); *G06F 3/0673* (2013.01)

(58) Field of Classification Search
CPC .... G06F 3/0673; G06F 3/0652; G06F 3/608; G06F 3/604; G06F 2212/7205; G06F 12/0253
See application file for complete search history.

(56) References Cited

U.S. PATENT DOCUMENTS

| | | | | |
|---|---|---|---|---|
| 2006/0230087 A1* | 10/2006 | Andreasson | ........ | G06F 12/0253 |
| 2008/0163009 A1* | 7/2008 | Wintergerst | ........ | G06F 12/0253 714/699 |
| 2009/0319255 A1* | 12/2009 | Vengerov | ............ | G06F 12/0253 703/22 |
| 2010/0211753 A1* | 8/2010 | Ylonen | ............... | G06F 12/0253 711/165 |
| 2015/0095338 A1* | 4/2015 | Baggott | .............. | G06F 11/3476 707/740 |
| 2015/0121029 A1* | 4/2015 | Declercq | ............. | G06F 12/0891 711/170 |

* cited by examiner

*Primary Examiner* — David X Yi
*Assistant Examiner* — Alan Otto
(74) *Attorney, Agent, or Firm* — Schwegman Lundberg & Woessner, P.A.

(57) ABSTRACT

Systems and methods are provided to automatically analyze performance of an automatic memory management system. One example embodiment involves automatically gathering, using at least one processor of the server, garbage collection information associated with the garbage collection process and storing the garbage collection information in a garbage collection output file of a file system. The garbage collection output file may be analyzed to identify a plurality of flags associated with a performance of the server system that does not meet one or more performance thresholds. In certain embodiments, a first flag of the plurality of flags is associated with a first portion of the garbage collection information, and a second flag of the plurality of flags is associated with a second portion of the garbage collection information that is different from the first portion of the garbage collection information.

18 Claims, 10 Drawing Sheets

| Properties of selected GCs in the configured Concurrent Mark Sweep GC algorithm | |
|---|---|
| Details about GC 152,596 (full) | |
| <enter a string to search>    ⇐  ⇒ 107498 | |
| Attribute | Value |
| Used bytes in young after GC | 51.9 MB |
| Used bytes in young (diff) | -585 MB |
| Max young size | 373 MB |
| Tenuring threshold | 14 |
| Used bytes in old | 1.50 GB - 1.60 GB |
| Used bytes in old before GC | 1.60 GB |
| Used bytes in old after GC | 1.60 GB |
| Used bytes in old (diff) | -25.6 KB |
| Bytes promoted to old | 0 B |
| Bytes surviving young GCs | |
| Max old size | 1.60 GB |
| Permanent Generation | |
| Used bytes in perm | 381 MB - 381 MB |
| Used bytes in perm before GC | 381 MB |
| Used bytes in perm after GC | 381 MB |
| Used bytes in perm (diff) | 0 B |
| Max perm size | 1.00 GB |
| Bytes allocated in perm until now | 1.00 GB |
| Bytes freed in perm until now | 1.00 GB |
| Bytes concurrently freed in perm | 0 B |
| Reference Handling | |
| Forced cleaning of SoftRefs | no |
| Nr. of soft refs cleaned until now | 3,756,395 |
| Nr. of soft refs enqueued until now | 979,675 |
| Nr. of week refs cleaned until now | 610,929 |
| Nr. of week refs enqueued until now | 66,174 |
| Nr. of final refs enqueued until now | 14,843,382 |
| Nr. of phantom refs enqueued until now | 211 |
| Other | |
| Ongoing concurrent GC | |
| Allocation goal | 0 B |
| Cumulative duration | 1d 1542 |
| Cumulative CPU time | 138d |
| Events | |
| CMS (stop-the-world) initial handling phase | |
| CMS (potentially concurrent) handling phase | |
| CMS unable to complete concurrently, stop the world | |
| Reference handling during full GC (All generations) | |
| Tenured generation GC | |

FIG. 6

AUTOMATIC ANALYSIS OF ISSUES CONCERNING AUTOMATIC MEMORY MANAGEMENT

FIELD

This disclosure relates generally to the field of data processing systems. More particularly, certain embodiments relate to analyzing garbage collection operations which function as part of automatic memory management of a system.

BACKGROUND

Memory on any computing system is a limited resource. No matter how fast computing systems become, they always depend upon a finite amount of memory in which to run their software applications. As a result, memory limitations are a consideration for software developers when writing and developing software applications.

Some systems deal with memory limitations using automatic memory management. For example, the Java programming language differs from many traditional programming languages (e.g., C and C++) by the way in which memory is allocated and deallocated. In languages like C and C++, memory is explicitly allocated and deallocated by the application programmer/developer. This can greatly increase the time spent by programmers in tracking down coding defects in regards to deallocating memory.

By contrast, the Java runtime environment (e.g., Java virtual machine) provides a built-in mechanism for allocating and deallocating memory. In Java, memory is allocated to objects. The Java virtual machine ("VM" or "JVM") automatically handles the amount and allocation of memory upon an object's creation. The Java runtime environment employs a "garbage collector" to reclaim the memory allocated to an object that is no longer needed. Once the garbage collector determines that the object is no longer accessible (e.g., when there is no longer any references to it stored in any variables, the fields of objects, or the elements of any arrays, etc.), it reclaims the allocated memory. When objects in a Java application are no longer referenced, the heap space the object occupied is to be recycled so that the space becomes available for subsequently-created objects.

BRIEF DESCRIPTION OF THE DRAWINGS

The invention is illustrated by way of example, and not by way of limitation, in the figures of the accompanying drawings in which like references indicate similar elements.

FIG. 6 illustrates a GUI, in accordance with an example embodiment, for analysis of garbage collection processes.

DETAILED DESCRIPTION

Figure 1:
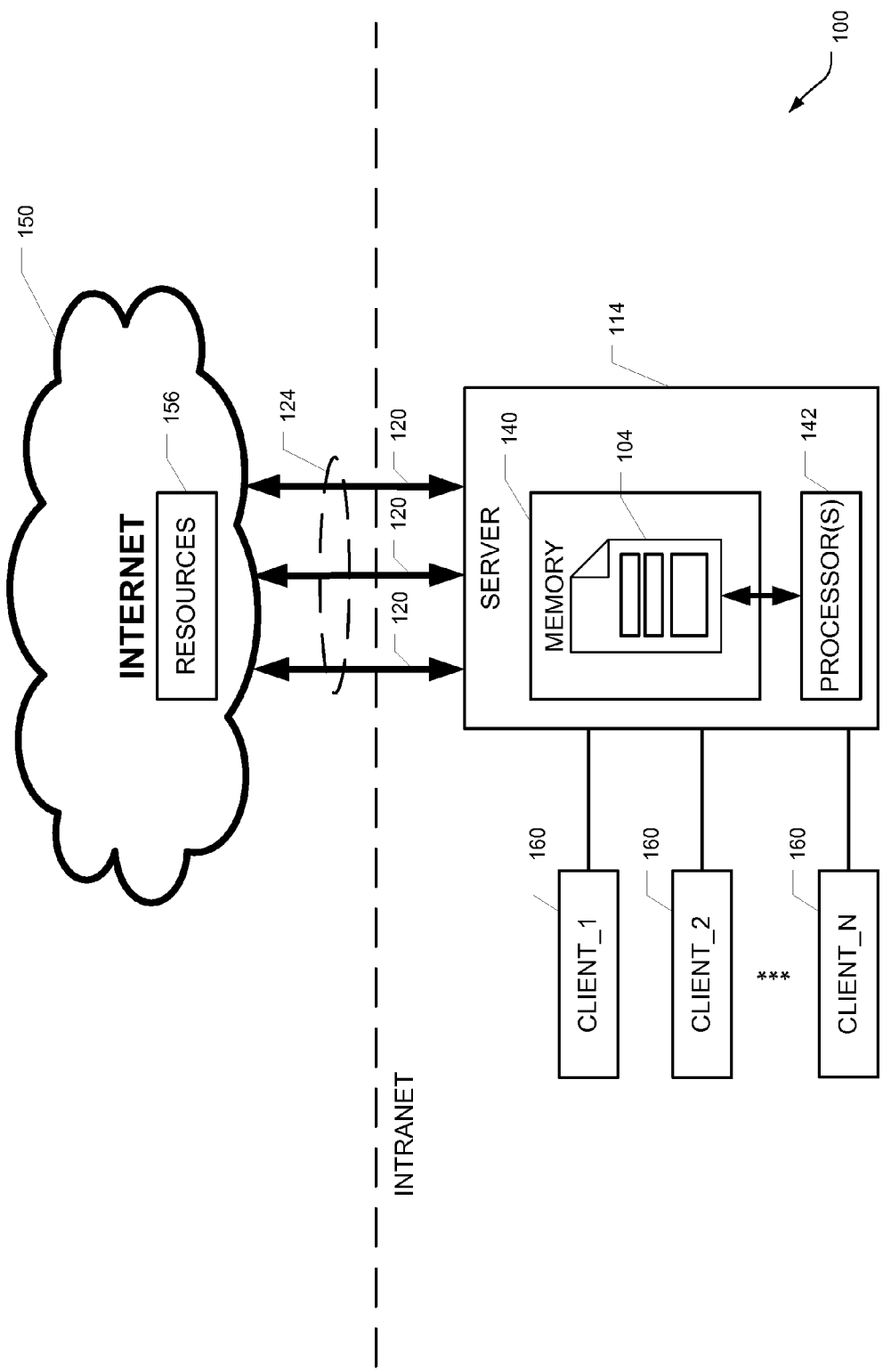
FIG. 1 illustrates a system, in accordance with an example embodiment, to analyze and correct problems in garbage collection processes.

In the following description, for purposes of explanation, numerous specific details are set forth in order to provide an understanding of various embodiments of the inventive subject matter. It will be evident, however, to those skilled in the art that embodiments of the inventive subject matter may be practiced without these specific details.

Example embodiments described herein relate to systems and methods for automatic identification of problems in the runtime behavior of garbage collection processes in a computing system. The example embodiments may improve the performance of computing systems with automatic memory management. "Performance" as described herein includes the ability of a computing device to execute applications without interruptions caused by memory management processes using microprocessor resources or caused by out of memory errors when the memory management has failed to free enough memory resources for system use. Below target threshold performance may be associated with increased use of microprocessors to run memory management processes and increased interruption of applications while memory is unavailable after the application requests memory resources. Example embodiments may further relate to automatic correction of certain identified problems. In certain example embodiments, such analysis of garbage collection processes may function by recording statistical data about previous garbage collections and then automatically checking the recorded data for specific issues described herein by way of example. The analysis may identify memory management problems associated with runtime of garbage collection processes, either due to configuration errors, faulty runtime processes, or other such problems. The analysis results may be structured as system feedback or as a report that includes hints as to which areas need closer inspection.

"Garbage collection" as referred to herein includes processes for automatic memory management, whereby memory resources that have been allocated to a particular purpose are returned to general system availability so that they may be used for another purpose. If, for example, all of a system's memory resources are allocated when additional memory is needed, and limited or no memory management process is available, a system will typically create an out of memory error. Garbage collection is very useful in computer systems because it enables the engineers building the systems to focus on features rather than the time consuming task of manual memory management. Unfortunately, the behavior of the automatic memory management can impact the overall systems behavior in various ways. Example embodiments described herein may monitor the runtime behavior of the automatic memory management subsystem to automatically identify these impacts. An automatic analysis providing hints and system feedback on which areas need closer inspection may improve the operation of a system using automatic memory management.

As described herein, various embodiments may refer to Java™ or Java virtual machines merely by way of example. Example embodiments described in this fashion will be understood to apply to any other runtime systems which includes automatic memory management. This may include Python virtual machines, Ruby virtual machines, and any other such environment that operates with garbage collection to manage memory resources.

For the purposes of this document, an "application" is intended to include a collection of instructions that can be executed by a processor. Such applications include browsers, word processors, spreadsheet processors, presentation processors, database processors, drawing processors, and the like. Applications may be used to process electronic content.

"Electronic content" or any other reference to "content" is intended to include any digital data that may be presented to a user (e.g., visually and/or audibly presented), such as an electronic document, page-descriptive electronic content such as a page-descriptive electronic document, a media stream, a web page, a hypertext document, an image, a digital video or video recording, a digital audio or audio recording, an animation, a markup language document, such as for example a document including HyperText Markup Language (HTML) or Extensible Markup Language XML, a form having components to be filled in, data describing the application of a graphical user interface (GUI), or the like. Electronic content may comprise a variety of content elements.

Applications or computing processes may make use of memory resources by generating references that assign certain types of data or content to certain memory locations. As part of such referencing, certain references may have associated characteristics that provide an indication of how the memory usage should be treated by garbage collection processes. For example, a reference may be considered a "strong" reference or a "soft" reference. A strong reference may refer to a memory resource usage that should (e.g., ideally) not be removed by a garbage collection process. A soft reference may indicate that a garbage collection process may (e.g., ideally) remove the memory resource usage to free up memory for other uses if necessary. For example, if a reference may be used later, but it is not certain that it will be used later, it may be flagged as a soft reference to prevent deletion of the data unless a higher priority usage need arises. In various embodiments and systems, different terms may be used to identify the importance of maintaining a memory usage even when available memory is in short supply. Additionally, different embodiments may use any number of tiers or levels of reference strength that may provide information to garbage collection processes. Thus, a plurality of strength parameters may be provided wherein each strength parameter identifies a different memory usage priority. Thus, a plurality of reference parameters may be provided that may provide an indication of the relative importance of data in a memory resource.

FIG. 1 illustrates a system 100, in accordance with an example embodiment, to analyze garbage collection processes. The garbage collection processes may function as part of a system's automatic memory management. The system 100 is shown to include a server 114 communicatively connected to a plurality of resources 156 via one or more networks 150. The networks 150 may include a wide area network (WAN), the Internet, or the like, or any combination of networks. The server 114 is shown to include memory 140 and one or more processors 142. A plurality of client devices 160.1-160.*n* is communicatively connected to the server 114 (e.g., via an Intranet). FIG. 1 shows the server 114 executing an application 104 using a processor 142. The processor 142 may be any hardware processing component or an integrated circuit microprocessor such as an application specific integrated circuit, an application specific instruction set processor, a multi-core processor with independent processing cores as part of a single processing component, or any other such physical device that may be used to implement a processing unit. The application 104 may be a set of executable instructions operating using the processor 142 to implement methods for automatic analysis of garbage collection processes according to certain example embodiments. As a part of accessing a variety of resources 156, numerous uniform resource locator (URL) service requests 120 may be submitted over the network 124. Such requests may result from the use of a browser by the client devices 160 that operate to continually access a particular web site. Some of the service requests 120 may result in significant consumption of the memory 140 within the server 114.

In a JVM, the memory 140 used to store items such as objects is called a heap space. The heap space can be divided up into smaller spaces called generations. There are usually several generations within the heap, which may be sorted by various associations of the items stored therein.

The heap space in the memory 140 is managed by the JVM, in part, through garbage collection activity. The garbage collector moves data items around in the memory heap space and determines whether certain items or memory references are kept or discarded. Without garbage collection activity, the available portions of memory 140 would be used up relatively quickly, and all parts of memory 140 would be in use with no space for additional activity. Thus, after a number of service requests 120, such as URL requests, a garbage collection event will occur to free up space in memory 140 that is no longer needed.

Figure 2:
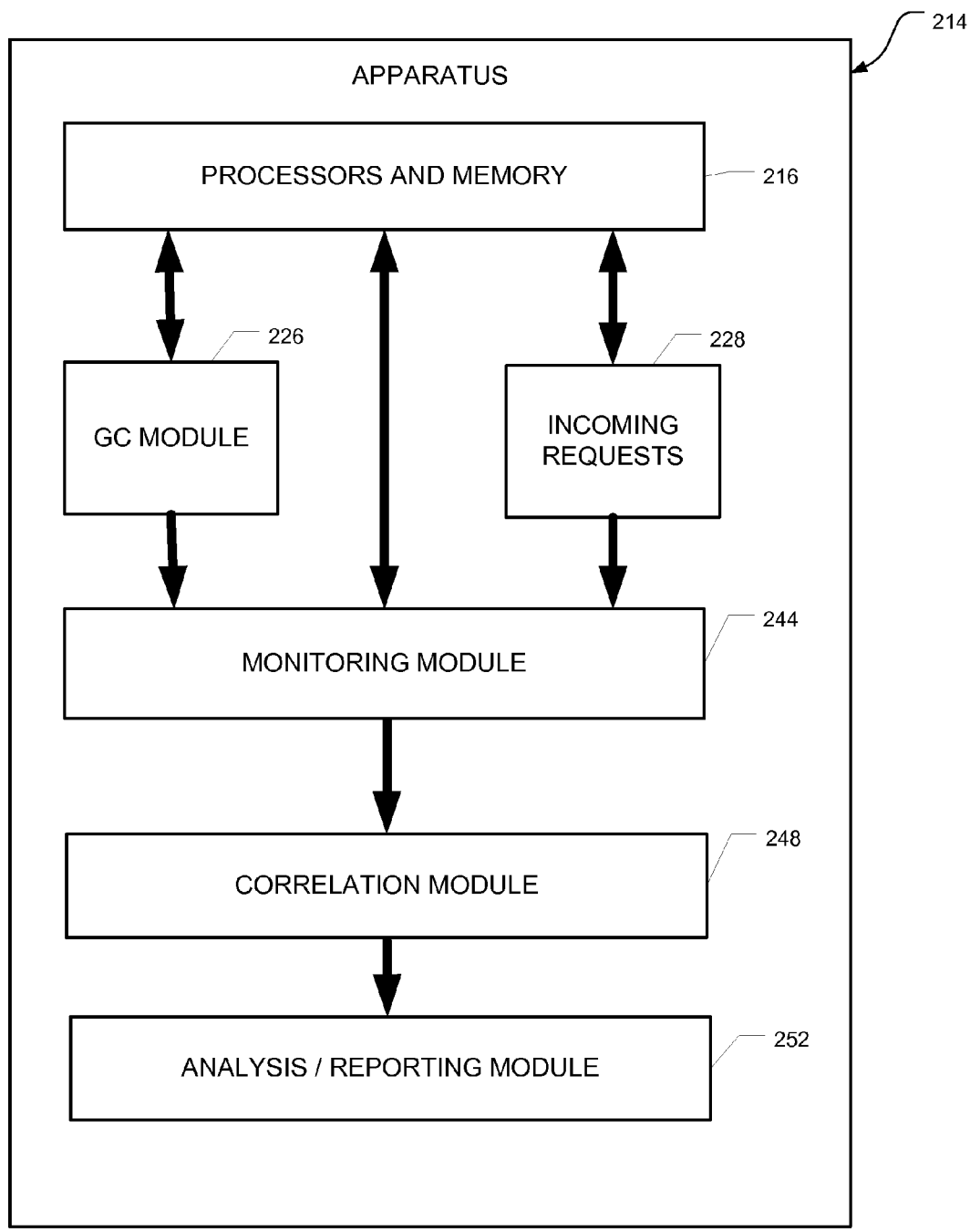
FIG. 2 illustrates a block diagram of an apparatus, in accordance with an example embodiment, to analyze garbage collection processes.

FIG. 2 is a block diagram of an apparatus 214, in accordance with an example embodiment, to analyze garbage collection processes. The apparatus 214 may be used for identifying garbage collection information and identifying flags associated with low performance based on analysis of the garbage collection information. The apparatus 214 may form part of the server 114 of the system of FIG. 1 and, accordingly, is described merely by way of example with reference thereto. The apparatus 214 may be integrated with a virtual machine operating on any server computing device or may operate on a separate device coupled to the computing device being analyzed. In the example embodiment of FIG. 2, it can be seen that the apparatus 214 comprises hardware that provides data as input into several example modules. The hardware in this example embodiment comprises processors and memory 216. The apparatus 214 further includes a garbage collection module 226. The garbage collection module 226 analyzes collection processes executing as part of a processor executed automatic memory management of a memory device such as memory 140. Data, including any data associated with garbage collection performed by garbage collection module 226 and incoming service requests 228 (e.g., requests for URL access) may then be collected on apparatus 214. The apparatus is further shown to include a monitoring module 244, a correlation module 248, and an analysis/reporting module 252. It will be appreciated that various modules may be combined and that further modules performing various garbage collection functions may also be provided.

Incoming requests 228 can be operatively generated as a result of activity resulting in the processors utilizing the memory. As the incoming requests 228 occur, and as memory is allocated in response, events associated with the garbage collection module 226 will also occur. As the requests 228 and operations performed by the garbage collection module 226 take place, information related to their operation can be archived with reduced little performance impact because there is no requirement to halt either the garbage collection processes or the application processes to archive the information.

The operations performed by the garbage collection module 226 and incoming requests 228 may both be used to generate garbage collection information in different ways, depending on the configuration of an analysis system. For example, the monitoring module 244 may receive notification of a first garbage collection event from the garbage collection module 226. This notification may include both an indication of the completion of the first garbage collection event, or may involve separate notifications for a beginning of the first garbage collection event and an end of the first garbage collection event. The monitoring module 244 may then gather information about the state of the memory just prior to the beginning of the first garbage collection event as well as information about the state of the memory just following the end of the first garbage collection event. This may be aggregated as garbage collection information and stored in a garbage collection output file for further analysis by the analysis/reporting module 252. The monitoring module 244 may additionally receive any other information relevant to the first garbage collection event. Further, the monitoring module 244 may periodically, continuously, or in response to a trigger, gather information about the state of an automatically managed memory so that the information will be available for the garbage collection output file as part of the garbage collection information when the garbage collection module 226 provides notification that the memory state is being adjusted by a garbage collection process.

Additionally, garbage collection information may include details of the type, frequency, and other details of memory requests being received by the managed memory. This information may be received as part of the incoming requests 228 and stored by the system for integration with other garbage collection information as part of a garbage collection output file. Certain flags associated with poor system performance, or performance that does not meet certain thresholds, may relate to bursts of incoming requests 228 which outstrip the ability of the apparatus 214 to provide available memory resources, or other such circumstances. Accordingly, details associated with the requests received by a managed memory may be useful for further review and hence are processed by the analysis/reporting module 252.

Analysis performed by analysis/reporting module 252 relies on the system being able to receive detailed information about each garbage collection operation and record this information while the application is running. In an example embodiment, a system for recording such information may be implemented as part of a JVM. An example of such a virtual machine is described in FIG. 8. Additional example embodiments may use alternative methods for gathering such information. In certain example embodiments, after recording garbage collection data for some observation time, a garbage collection report may be generated by the apparatus 214 through scanning over all information for the garbage collections once and collecting information on potential problems identified by flags. The flags may be used automatically by the apparatus 214, or communicated to a troubleshooting tool or interface to be used in generating hints associated with performance issues. These hints may be preprocessed (e.g. sorted by severity, filtered, etc.) and presented to the user in a readable report. In example embodiments, different hints are provided for different types of issues to detect as described below in additional detail.

Figure 3A:
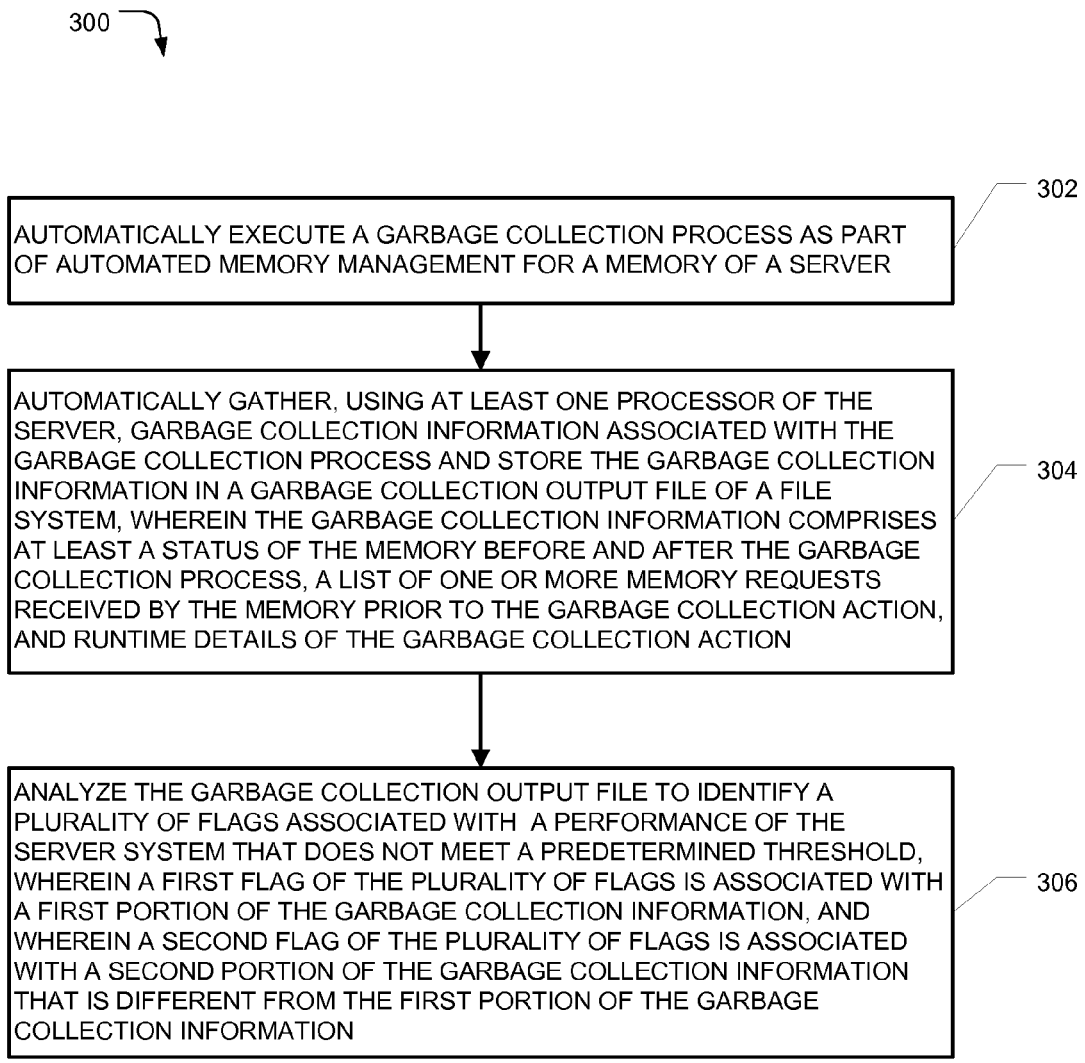
FIG. 3A illustrates a method, in accordance with an example embodiment, for analysis of garbage collection processes.

FIG. 3A illustrates a method 300, in accordance with an example embodiment, for analysis of garbage collection processes. The method 300 may be performed by the apparatus 214, and is therefore described merely by way of example in the context of the apparatus 214. In other example embodiments, other systems, servers, or computing devices may be used to perform the method 300.

As shown in operation 302, the method 300 includes automatically executing a garbage collection process as part of automated memory management for a memory of a computing device (e.g., the server 114 or the apparatus 214). Thus, the apparatus 214 of FIG. 2 may operate as such a server, with the processors and memory 216 automatically executing a garbage collection process in conjunction with the garbage collection module 226. Such garbage collection processes may operate as part of management of a memory that is part of processors and memory 216, in order to clear unused space within the memory, and in order to insure that memory is available. For example, as the incoming requests 228 are received, new memory allocations for various applications are provisioned.

As shown in operation 304, the method 300 further includes automatically gathering, using at least one processor of the apparatus 214, garbage collection information associated with the garbage collection process and storing the garbage collection information in a garbage collection output file of a file system (e.g., in memory of the processors and memory 216). Such garbage collection information may be gathered by the monitoring module 244. The garbage collection information may be gathered from garbage collection module 226, from incoming requests 228, directly from processors and memory 216, or from any other source of the garbage collection information. In an example embodiment, the garbage collection information comprises at least a status of the memory from the processors and memory 216 before and after the garbage collection process, a list of one or more memory requests received by the memory prior to the garbage collection action from the incoming requests 228, and runtime details of the garbage collection action from the garbage collection module 226.

Thereafter, as shown at operation 306, the method 300 analyzes a garbage collection output file to identify a plurality of flags associated with a performance of the apparatus 214 (e.g., a server system) that does not meet a predetermined threshold or reference performance criteria. Such thresholds may be stored in either the correlation module 248 or the analysis/reporting module 252. The garbage collection information from the garbage collection output file may be compared to the performance thresholds to trigger flags. Thresholds may be created and input to the apparatus 214 by a system administrator, or may be generated by automatic analysis of garbage collection information over a period of time to automatically generate threshold performance values by measuring performance when a system is fully functional and error free. The apparatus 214 may analyze a large number of different types of garbage collection information instead of simply analyzing a single type of information to identify a single flag. Thus, during execution of the method 300, a first flag of the plurality of flags is associated with a first portion of the garbage collection information, and a second flag of the plurality of flags is associated with a second portion of the garbage collection information. The second portion of the garbage collection information may be different from the first portion of the garbage collection information. Different aspects of the garbage collection information in the garbage collection output file may thus be used to generate different flags as part of the same automatic analysis of garbage collections arising from operation of the automatic memory management for apparatus 214.

Figure 3B:
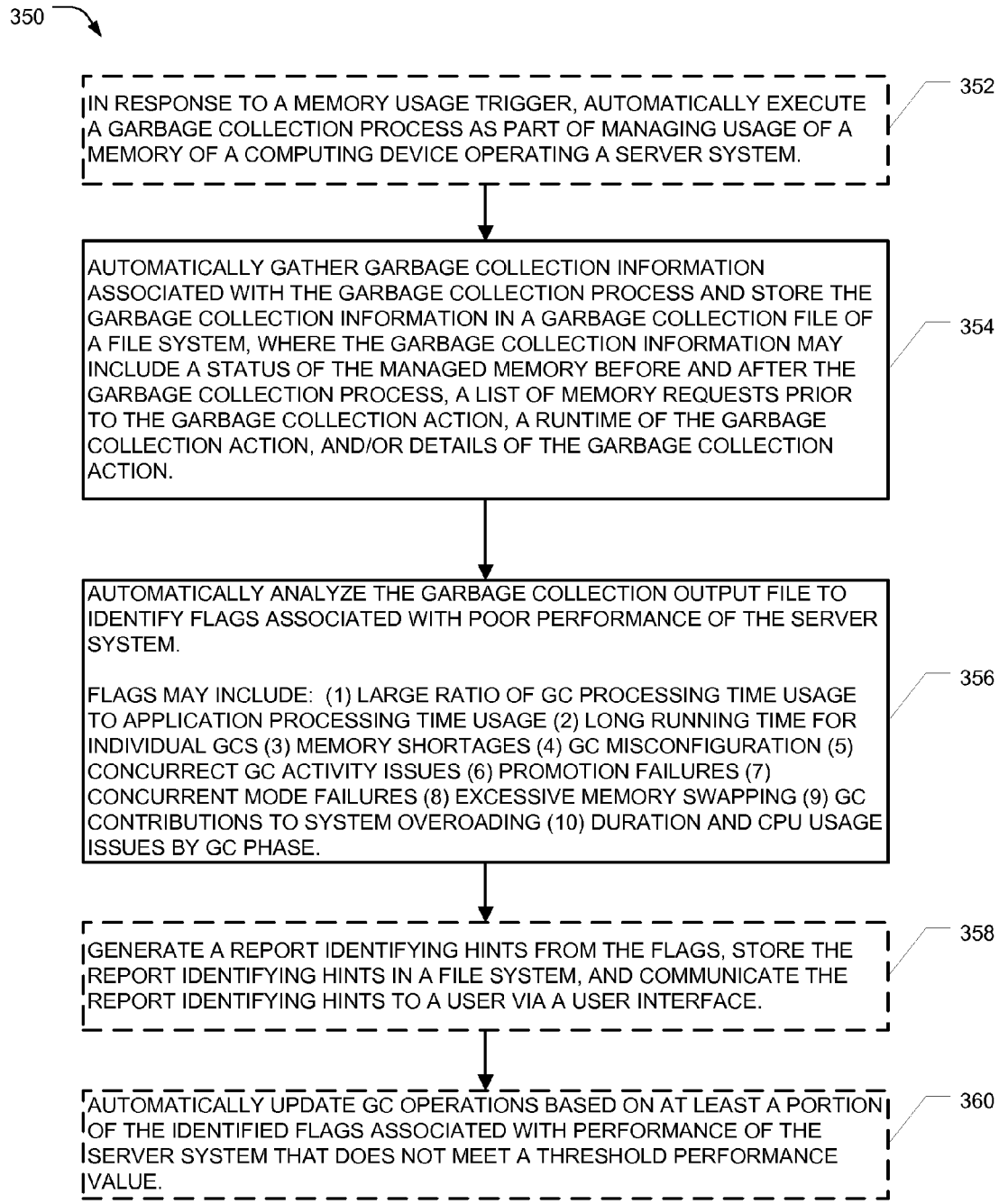
FIG. 3B illustrates another method, in accordance with an example embodiment, for analysis of garbage collection processes.

FIG. 3B illustrates another method 350, in accordance with an example embodiment, for analysis of garbage collection processes. The method 350 optionally occurs in a system that integrates the automatic analysis of the memory management system with the memory management system on the same device. In such systems, the automatic memory management system will have a trigger that initiates a garbage collection process. This may be a predetermined percentage of the available memory being in use, an amount of memory available being less than a predetermined threshold number of memory bytes, a periodic system clean-up, or any other such trigger. In response to such a trigger, a garbage collection process is automatically executed as part of managing usage of the memory of a computing device operating a server system. Accordingly, the method 350 includes, in response to a memory use trigger, automatically executing a garbage collection process as part of managing usage of a memory of a computing device operating a server system (see operation 352).

In systems where the automatic analysis of memory management is performed by a separate computing device than the computing device with memory managed and analyzed by the system, garbage collection information may be gathered as part of the garbage collection process or by peripheral processes. This information may then be communicated to the separate analysis device. For integrated systems, the garbage collection information may simply be stored locally in a file system and used when needed.

Operation 354 then involves automatically gathering garbage collection information associated with the garbage collection process and storing the garbage collection information in a garbage collection file of a file system. This may comprise gathering the information automatically from a local file system, or receiving the information via an input/output system if the analysis is performed by a device separate from the computing system with automatic memory management. The gathered garbage collection information may be information directly describing the garbage collection process, or may be indirectly related information describing the status of a system or communications to and from the system surrounding garbage collection process. The garbage collection information may include a status of the managed memory before and after the garbage collection process, a list of memory requests prior to the garbage collection action, a runtime of the garbage collection action, and/or any other such details directly from the garbage collection action or indirectly associated with the garbage collection action due to impacts on the managed memory.

In operation 356, after the garbage collection information is gathered, the method 350 includes analyzing the garbage collection output file to identify flags associated with poor performance or performance that does not meet certain performance thresholds of the server system. Various embodiments may be particularly configured to identify different types of memory management issues. For example, flags for the following memory management issues may be set: (1) large ratio of garbage collection processing time usage to application processing time usage; (2) long running time for individual garbage collections; (3) memory shortages; (4) garbage collection misconfiguration; (5) concurrent garbage collection activity issues; (6) promotion failures; (7) concurrent mode failures; (8) excessive memory swapping; (9) garbage collection contributions to system overloading; (10) duration and processing unit usage issues by garbage collection phase; or the like. Variations or combinations of these memory issues may also be monitored.

Following operation 356, the method 350 may use the flags identified by the analysis in different ways. In certain example embodiments, an operation 358 may optionally generate a report including the flag information structured as troubleshooting hints in a reporting tool or automatic memory management analysis report (e.g., see the analysis reporting module 252). This may involve generating a report identifying flags, storing the report identifying flags in a file system, and communicating the report identifying hints to a user via a user interface.

In certain example embodiments, following the operation 356, a system or apparatus (e.g., the apparatus 214) may use the flags identified during operation 356 to automatically update garbage collection operations (see operation 360). These garbage collection operations may be updated based on at least a proportion of the identified flags associated with performance of the server system that does not meet a threshold performance value. This may include resetting garbage collection operational values associated with one or more flags to default system settings. For example, a table of flag settings with associated corrective adjustments may be stored and the table may then be used to automatically adjust garbage collection settings based on the table values. This may involve disabling certain optional garbage collection settings that are associated with flags. An automatic iterative feedback process may be provided whereby an analysis system automatically adjusts settings associated with garbage collection operation, observes changes in subsequent garbage collection information for garbage collections occurring after the automatic setting adjustments, and then further adjusts the settings based on the observed changes in subsequent garbage collections. In an example embodiment, an iterative automatic adjustment of garbage collection options may proceed until all flags are dealt with and not seen in subsequent garbage collection operations or until one or more flags are considered unsuitable for automatic update. Flags may be considered unsuitable for automatic updates based on system settings, previous observations of the same flag, or based on automatic adjustments worsening the performance of the system rather than improving the performance. For example, if garbage collection processes use an increased percentage of processing resources, thereby causing applications a greater amount of stall time while memory is allocated for the applications following previous garbage collection processes, the method 350 may return one or more adjusted settings to a previous value and raise or set an additional flag for a garbage collection output report identifying the failure of automatic adjustments.

FIGS. 4-7 illustrate various GUIs, in accordance with example embodiments, for analysis of garbage collection processes. Such GUIs may include reports based on hints or flags that are generated as part of automatic analysis of garbage collection processes as described in the method 350. Accordingly, the method 350 may generate one or more of the GUIs shown in FIGS. 4-7. The reports shown in the GUIs may provide statistical and summary information for garbage collection processes and issues associated with automatic memory management. For a large server system or a group of server systems that share an automatic memory management system, such summaries and statistical details of many garbage collection processes may be significantly more efficient way of reviewing and identifying issues with automatic memory management than providing a troubleshooting software engineer with a data readout from all garbage collection processes. In addition to the issues with a troubleshooting user even being able to identify flags for poor server performance from the massive amounts of data that would be associated with large server system, certain flags described herein are simply not identifiable by a troubleshooting engineer using standard garbage collection reports. By gathering additional information not directly available from the garbage collection process as garbage collection information and generating flags from this garbage collection information, a greater number of flags may be generated by the automatic analysis described herein.

Figure 4:
FIG. 4 illustrates a graphical user interface (GUI), in accordance with an example embodiment, for analysis of garbage collection processes.

As part of such an example analysis, FIG. 4 illustrates a graphical user GUI, in accordance with an example embodiment, for analysis of garbage collection processes. FIG. 4 particularly illustrates hints that may be generated as part of a garbage collection hint report 400. The garbage collection hint report 400 is shown by way of example to include four hints 402, 404, 406, and 408 generated from garbage collection flags (e.g., by the methods 300, 350) during analysis of garbage collection processes.

Hints, as described herein, include alert communications that may be output to a user interface or a display. Hints include details of garbage collection performance including details particularly directed to thresholds which are compared with garbage collection data. The hint 402, for example, describes garbage collections that ran for a period of time longer than a selected time threshold (e.g., 60 second threshold in this example). As part of the GUI including the garbage collection hint report 400, the hint 402 flags the two garbage collections that failed to meet the threshold, identifies that these make up 0.01% of all garbage collections, and may provide a link or network communication interface to additional details about these and other garbage collection processes with the associated details stored with analysis content in the garbage collection output file. It will be appreciated that the reference values (e.g., time, memory shortage, etc. may vary from one embodiment to another.

The hint 404 describes memory shortages and details associated with memory shortages. The hint 404 identifies a number of full garbage collections that freed all available or possible memory. The hint 404 describes a number of full garbage collections where all soft references were force cleaned, along with what percentage of all garbage collections this included, a memory shortage cause (e.g. insufficient Java heap,) and whether the shortages occurred in consecutive garbage collection actions. The hint 404 also includes and link to additional garbage collection details or analysis from the garbage collection output file.

The hint 406 is associated with promotion failures and includes associated promotion failure information. The hint 408 is associated with concurrent mode failures, and includes associated concurrent mode failure information. Additional details on these failure types are below. In certain embodiments, a hint communication may include a list of hints derived from all flag types, including flag types that were not associated with a particular threshold failure in a current system analysis. Thus, hints such as hints 402-408 may include hints identifying that no memory shortages occurred, or other such information. In various embodiments, the hints and the flag types presented and used to generate the hint communication may include any flag type described herein and may further include other flag types as well as combinations of the flag types described herein.

One flag may relate to an application vs. garbage collection time ratio. In an ideal world, all the available processing time would be spent in executing the application. Since computer memory is limited, some resources have to be used for memory management, but the goal is to reduce (ideally minimize) this. The amount of time spent in garbage collection in relation to the total available (elapsed) time therefore can be an indicator for the performance of the garbage collection configuration with this particular application.

As concurrent garbage collection activities only have a minor impact on application execution, it is sufficient to sum up the time spent in stop-the-world garbage collection of all garbage collections in the observation period and calculate the garbage collection time ratio as percentage of the total observation time. High values indicate a problem. The threshold for the garbage collection time ratio is application dependent. The threshold setting may depend on the allocation rate, but certain embodiments may set a threshold (e.g., a 50% threshold). When a maximum threshold (e.g., 100%) concurrent garbage collection activity is seen, a flag should be generated.

Suspiciously long running garbage collections may be associated with another flag type. When the application has to be stopped to perform garbage collection, it may be unfavorable for the request response time as well as the throughput of the application. In interactive scenarios, long pause times may be observable by the user. This is why, in some example embodiments, not only the total garbage collection time is relevant, but also the duration of single garbage collections.

An automatic analysis can filter garbage collections (e.g., all garbage collections) that are suspiciously long running and present them for further investigation. The threshold of a pause time that will trigger an alert or further investigation may be application dependent and will be much lower for interactive applications than for background jobs. In certain embodiments, if available memory amounts allow, automatic responses to such a flag may enable portions of a memory to be blacklisted from automatic memory management processes, thus inhibiting (ideally preventing) repetition of long-running garbage collection processes which each unsuccessfully attempt to deal with a certain memory reference or set of references.

The statistical data recorded for the reported garbage collections can provide hints for further investigation. For example, time stamps may be correlated with application and system log files. Detailed information about filling levels of the several memory regions may point to configuration issues. Timing and duration of the separate phases of the garbage collection could also help to spot and fix problems.

Memory shortages suffered by the system may also be associated with flags. If the allocation of a Java object fails, it may be up to the garbage collection to free enough memory using possibly several different measures. This may cause different collection cycles to be started. Generally, the last step of the process of garbage collection, before throwing an out of memory error, includes a full garbage collection that clears all soft references, which may be used for caches. Therefore, it is possible to deduce from a full garbage collection that clears all soft references that the system suffers from acute memory shortage. It can be caused by many (or large) soft referenced objects or just too little memory space for the application. In an example embodiment, as an additional check on soft reference issues is possible to check how many soft references were cleared and how much additional memory was freed during the last garbage collection.

An automatic analysis (e.g., performed by the methods 300, 350) can filter all full garbage collections that substantially clear (ideally all) soft references and present them for further investigation. It may also be relevant for a report to indicate if the garbage collection was able to free enough memory or if the problem persisted. Consecutive full garbage collections that clear soft references are an even stronger indicator of memory shortage.

In an example embodiment, garbage collection configuration issues may be identified and indicated with a flag. Good implementations of memory management should adapt automatically to the environment and the resources, such as the number of CPUs and available memory. However, different applications have different requirements concerning the runtime behavior of garbage collection. Therefore, there are typically many configuration options to influence that behavior and, hence, a risk of potential misconfiguration.

What may be considered a problem in garbage collection configuration depends on the particular garbage collection implementation and the available options. An automatic analysis (e.g., as performed by the methods 300, 350) can still provide additional value, for example, in two ways. First, it can collect all the configuration options (possibly set at different places) that influence memory management and present them clearly laid out. Second, it can highlight obvious mistakes in these options. Examples include parameters specified multiple times, possibly with different values, memory region sizes that exceed the physically available memory, configuration values for a number of parallel garbage collection threads that exceed the number of available Central Processing Unit (CPU) cores, specified parameters that are not relevant for an enabled garbage collection algorithm on systems with multiple garbage collection implementations to choose from, and other such issues.

This list can easily be extended with new examples of misconfiguration identified by users that may be associated with a particular memory management implementation. In certain example embodiments, standard configuration values may be associated with a system (e.g., the server 1114 or the apparatus 214). If a configuration flag is raised, the analysis system may automatically adjust the configuration values to the standard configuration values. The system may then further observe garbage collection processes after the adjustment of the configuration values and revert to the original configuration values if performance is degraded.

Concurrent garbage collection activity may be another flag of decreased system performance. Certain embodiments of garbage collection processes may require all applications in a system to halt while the garbage collections occur. By contrast, concurrent garbage collectors start before the memory is exhausted, so that the application can continue operating and allocate memory while the garbage collection process is active. Therefore, in example embodiments, several thresholds can be configured to identify when a garbage collection system starts a concurrent garbage collection of the old and permanent generations of memory. One of the thresholds may be the usage level of each generation (e.g., as a percentage (%)). Thus a background collection may be started (at the latest) if the usage level of one of the generations is reaching the threshold. Flags may be associated with such thresholds when an analysis determines that the concurrent garbage collection does not begin with sufficient time or resources to allocate memory to running applications.

In an example embodiment, for example in the server 114 and the apparatus 214, in case the amount of used memory in a generation exceeds a defined threshold and the concurrent garbage collector cannot free enough memory to lower the amount of used memory below the threshold, the garbage collection may immediately start another complete background collection cycle directly after finishing the previous cycle, because the threshold is still exceeded. This can lead to performance degradation (although the application is not stopped), since the garbage collection uses part of the available CPU time.

The automatic analysis may include the accumulated time used for concurrent garbage collections, which is set in relation to the observation time. If concurrent garbage collections are almost constantly active, this may be a sign that the concurrent garbage collection cannot catch up with the application's allocations. In addition, the analysis by the method 300, 350 evaluates the time between the end of a concurrent garbage collection and the start of the next to detect peaks in garbage collection activity and clusters of concurrent garbage collections for further inspection.

Promotion failures may be associated with certain flags. In certain example embodiments, objects that survive young generation collections are promoted to the old generation as part of memory system functionality. Such example embodiments include a contiguous free block in the older generation memory that is large enough to hold the promoted objects. If the old generation is fragmented, this may cause promotion failures and trigger a resource expensive compaction. The automatic analysis in such an example embodiment reports garbage collections with promotion failures for further inspection. The methods 300, 350 may evaluate their frequency and the pause times of these garbage collections to estimate the severity of the issue. In certain example embodiments, different flag or hint messages may be based not only on the presence of promotion failures, but also on the frequency of the promotion failures, and the severity of the impact that the promotion failures have on application delays or other poor system performance issues.

In example embodiments, concurrent mode failures may also have associated flags. A concurrent mode failure includes a situation where a concurrent garbage collection operation is interrupted before completion. For example, this may happen when the garbage collection algorithm predicts that the concurrent collection will not end before the heap becomes full. In this situation, the concurrent collection may be stopped and an alternate garbage collection process is performed, such as a full "stop the world" garbage collection. Occurrence of concurrent mode failures may thus be a favorable indicator for garbage collection configuration issues. The automatic analysis (e.g., via the analysis/reporting module 252) may report garbage collections with concurrent mode failures for further inspection. Accordingly, the methods 300, 350 may evaluate the frequency of garbage collection configuration issues and the pause times of these garbage collections operations to estimate the severity of the issue. Automatic adjustments to garbage collection processes may include earlier initiation of certain garbage collection processes in order to prevent concurrent mode failures, or adjustment of garbage collection treatment of certain reference types such as soft references.

Excessive swapping may be associated with certain flags. Many server operating systems allow applications to use more memory than the system actually has in main memory.

To make up for the shortage of main memory, operating systems may use some part of the hard disk as main memory extension, which is called swap space. A so-called page fault occurs if the memory address that an application tries to access is actually located on the hard disk. The operating system then has to suspend the application thread, load the referenced memory contents into main memory, and resume the application. This normal behavior, in certain circumstances, is called swapping. If many page faults, e.g., memory accesses to memory contents stored on the hard disk, occur in a short period of time, a system may spend most of the time loading memory from hard disk to main memory. This causes major degradation of the application and, therefore, also garbage collection performance. The garbage collection is affected in a special way because it sometimes scans nearly every used memory page of an application to find the living objects.

Using an operating system page fault counter, it may be hard to find an exact threshold to decide when swapping becomes excessive. Instead of using these counters, in an example embodiment it is simpler to compare the elapsed time and (user mode) working time of a garbage collection. Page faults may be handled by the operating system (e.g., in kernel mode). If the (e.g., in user mode) working time differs too much from the elapsed time it usually indicates swapping. For example, in certain embodiments, a threshold may be established that if more than a 10% or more than a 20% difference is seen between an elapsed time and a working time, then a flag may be created for page faults. In other embodiments, a 50% (or any other %) threshold may be used to create a flag. In still further example embodiments, different flags may be created for each of the above percentage thresholds, with increasing levels of priority assigned to the flags.

In one example embodiment, the automatic analysis for page faults may operate by evaluating the working time of the garbage collections (e.g., the used CPU time divided by garbage collection thread count). This may be compared to the elapsed time in these garbage collections, which should not be much higher (depending on how well the garbage collection implementation scales with the number of garbage collection threads). Garbage collections with high differences are reported for further investigation. In user mode, the elapsed time to work time ratio may then be associated as a metric for severity.

In example embodiments system overload flags may also be used. In situations where an ordinary time-sharing server system has more runnable threads than CPUs/Cores, the threads will compete for CPU time. In addition to creating context switches which impact system performance, the use of overload flags in a time-sharing system may also mean additional waiting time per thread. Highly parallel tasks like garbage collection are enhanced (e.g., optimized) for execution using several threads in parallel without long waiting times. All garbage collection systems apply a system load. A high garbage collection system load may cause major performance degradation for a server system as a whole when some garbage collection thread(s) have the issues discussed above. A high garbage collection system load thus contributes to poor system performance. A benchmark for the system load is the system load average. On platforms that support it, a JVM may keep track of the system load average as part of garbage collection monitoring. System load average usually includes the load average over the last 1/5/15 minutes. A threshold based on a system load average may then be used to create a flag for a high system load.

The automatic analysis methods described herein (e.g., implemented by the method 300, 350) can warn about long periods of high system load and report pause times for garbage collections in those periods.

A duration and usage of a CPU by garbage collection phase may also have associated flags. In an example embodiment, garbage collection processes may be carried out in phases. The exact breakdown and function of these phases may depend on the actual garbage collection algorithm implementation. Certain example embodiments may include one or more phases that scan memory (e.g., memory 104 or memory of the processors and memory 216) and find live or dead objects and mark them for preservation or deletion. Other phases may release resources used by dead objects, copy live objects to other memory regions, process special kinds of links to objects (e.g. soft/weak/final/phantom references in Java), or compact memory areas to avoid fragmentation.

Certain example embodiments of the methods 300, of automatic analysis of memory management systems may include detailed information about all phases for all garbage collections, including duration and CPU usage. This information for discrete garbage collection phases may be gathered as garbage collection information described above, and delivered to an analysis/reporting module or device. The automatic analysis can calculate the average and maximum values for duration and CPU usage and present them for each phase. Example embodiments may then include warning thresholds for those average and maximum values, and this data may be compared with the thresholds to create flags associated with the specific garbage collection phases of the implementation.

As described above, example methods described herein may create various flags during the analysis of garbage collection information, and generate one or more hint communications. In certain example embodiments, any combination of the example flags described herein may be created based on analysis of one or more garbage collection processes. Additionally, in response to any combination of the flags, an automated analysis system may provide automatic feedback to an automated memory management module to more aggressively identify references and used memory blocks for deletion to free up additional memory. This may serve as a temporary automatic system adjustment until additional and more detailed adjustments may be made. Analysis of the impact of the temporary automatic system adjustments may further be performed by the automated analysis system to verify that performance improvements have resulted from the temporary automatic system adjustments. If performance improvements are not seen, the garbage collection operations may refer to the original system settings prior to the temporary automatic adjustments.

As described above, example embodiments describe garbage collection operations that may be initiated in response to a trigger in order to manage memory in a server system. Information both directly and indirectly associated with the garbage collection operations may be gathered as garbage collection information and stored in a garbage collection file or database of a file system. In an example embodiment, the garbage collection information that is part of the garbage collection file or database may then be analyzed to identify flags associated with poor performance or performance that does not meet certain performance thresholds. The analysis may be used to generate a report that identifies the flags and creates a report that may be presented to a user via a user interface. FIGS. 4-7 illustrate example aspects of flags, reporting identifying flags, and communicating information identifying hints to a user via a user interface.

Figure 5:
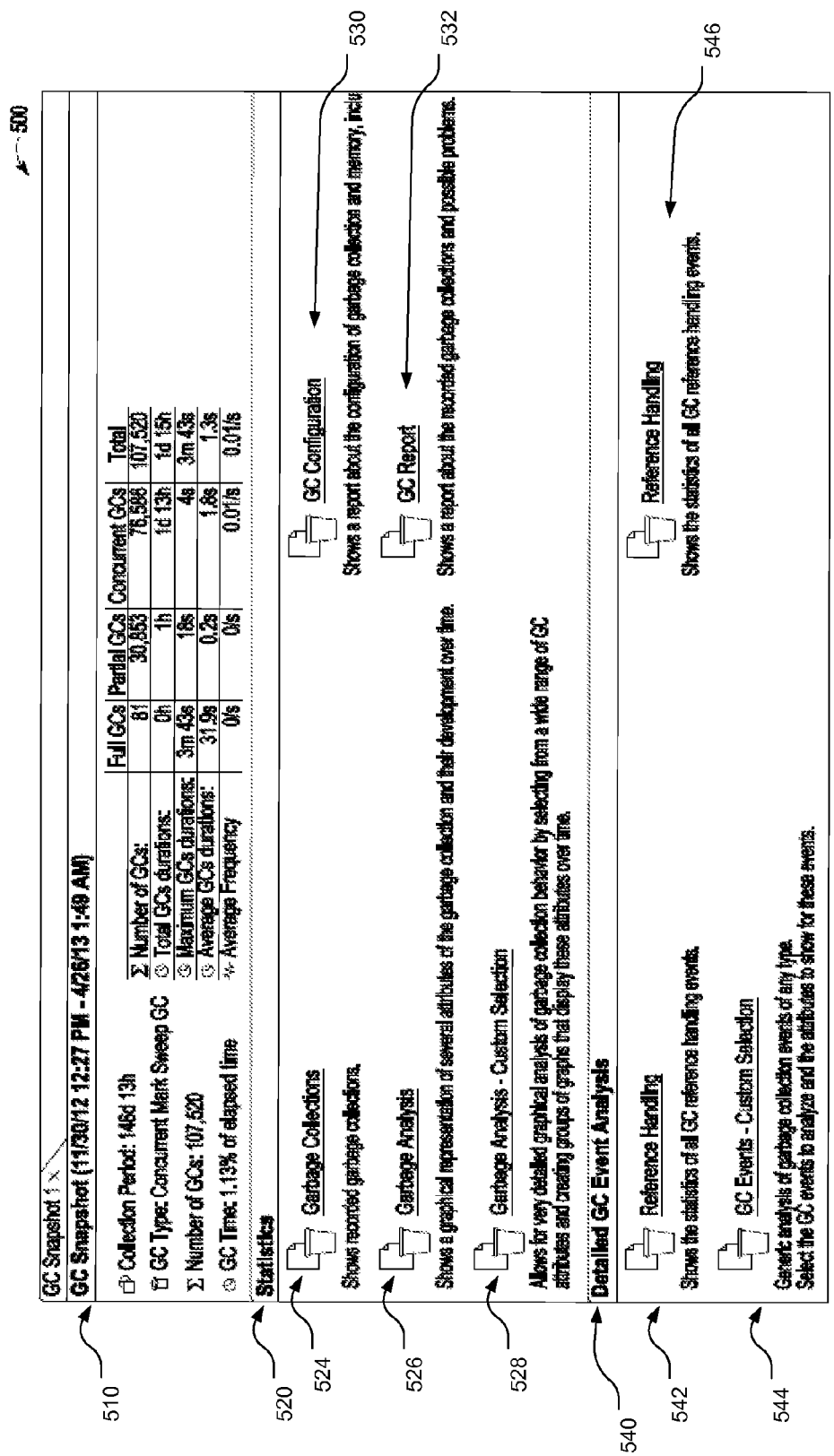
FIG. 5 illustrates a GUI, in accordance with an example embodiment, for analysis of garbage collection processes.

Referring to FIG. 5, reference numeral 500 illustrates a GUI, in accordance with an example embodiment, for analysis of garbage collection processes. The GUI 500 includes a garbage collection snapshot 520 showing basic information about system garbage collection activity and with user selectable inputs for retrieving additional information and analysis about garbage collections. In an example embodiment, this includes various statistical and system information. In a garbage collection snapshot 510, a collection period is shown, a garbage collection type, a number of garbage collections, a percentage of the collection period that was used for garbage collections, a number of garbage collections by type, including full, partial, concurrent, and a total number. The garbage collection snapshot 510 further includes garbage collection durations and frequencies by garbage collection type.

Additionally, the GUI 500 includes statistics 520 as a section of selectable interfaces for a number of statistical output reports, including garbage collections 524, a garbage analysis 526, a garbage analysis—custom selection 528, a garbage collection configuration 530, and a garbage collection report 532. The garbage collections 524 provides access to unfiltered garbage collection information, which in certain server systems operating over weeks or years may include many thousands or millions of lines of garbage collection information. Another example selectable input is a garbage analysis 526 that may provide graphical analysis of garbage collection information, including histograms of memory usage, garbage collection problems, and other such information. The garbage analysis—custom selection 528 may provide similar information to the garbage analysis 526, but with further user input options for customizing the information presentation and options. Another example selectable user input is a garbage collection configuration 530 that may present a configuration interface. The garbage collection configuration 530 may include additional inputs for adjusting configuration options for garbage collection operation, as well as displaying any automatic adjustments or default settings that may be implemented in a garbage collection system. Another example user input is a garbage collection report 532 that may provide access to a garbage collection report (e.g., see the analysis/reporting module 252) that includes a summary of garbage collection information along with analysis results.

Another example portion of the GUI 500 includes a detailed garbage collection event analysis 540. The event analysis 540 is shown by way of example to include reference handling 542, which shows the statistics of all garbage collection reference handling events. The event analysis 540 may include a garbage collection event custom selection 544, with analysis of garbage collection events combined with reference handling events as selected by a system default or a user input selection. The event analysis 540 is also shown to include reference handling 546, which shows the statistics of all garbage collection reference handling events.

FIG. 6 illustrates a GUI 600, in accordance with an example embodiment, for analysis of garbage collection processes. GUI 600 shows details about one single garbage collection. In various embodiments, additional details for a single garbage collection may be included. For example, embodiments may include 600 separate garbage collection information attributes about a single garbage collection process. GUI 600 is therefore different from GUI 500, since GUI 500 shows issues found in multiple garbage collection processes. GUI 600 includes a number of attributes 602 in a first column with associated values 604 in a second column. These attributes 602 and associated values 604 may further be presented in groupings such as permanent generation 620, reference handling 630, other 640, or events 650. These attributes 602 and associated values 604 may also be presented outside of a grouping as individual entries 612.

FIG. 6 illustrates a GUI 600, in accordance with an example embodiment, for analysis of garbage collection processes. The GUI may be generated by the methods 300, 350 and show, by way of example, details for a single full garbage collection which is listed as GC 152,596. In the example GUI 600, individual entries 612 include a number of bytes used in a young generation after a garbage collection, a maximum young generation size, a testing threshold, a number of bytes used in an old generation, a number of bytes used in an old generation before a garbage collection, a number of bytes used in an old generation after a garbage collection, a difference in the number of bytes used before and after a garbage collection, promotion details, surviving byte details, and maximum old generation size details.

A permanent generation section 620 of GUI 600 includes a number of bytes used in the permanent generation, a number of bytes used by a preferment generation before and after the garbage collection, with a difference value, a maximum permanent generation size, along with bytes available, allocated, and concurrently freed in the permanent generation by the garbage collection.

A reference handling section 630 of GUI 600 includes an attribute and associated value identifying whether force clearing of soft references was performed during the garbage collection. The reference handling 630 also includes a number of soft references cleaned up to the current system time, number of soft references enqueued until the current system time, a number of weak references cleaned up to the current system time, a number of weak references enqueued until the current system time, a number of final references enqueued until the current system time, and a number of phantom references enqueued until the current system time. Each of these may be associated with a value giving in number of references cleaned. While the example GUI 600 includes a number of elements showing references cleaned up to a current system time, in other example embodiments a number of references cleaned up until the time of the garbage collection may be used, or any other such metric for measuring a number of references cleaned may also be used.

Another section 640 of GUI 600 includes an attribute and associated value to indicate whether there are any ongoing concurrent garbage collections that occurred at the same time as the example garbage collection 152,596. The other 640 section also includes an allocation goal for the garbage collection, a cumulative duration of all garbage collections in the considered time period and prior to describe collection, and a cumulative CPU time used by all garbage collections during the considered time period and prior to this garbage collection.

An events section 650 of GUI 600 includes information related to different phases of the garbage collection and details related to reference handling during the full garbage collection.

While particular examples of garbage collection information and analysis of garbage collection information that may be present in a garbage collection output file are shown in the example GUI 600, any other such garbage collection information and analysis of garbage collection information may be present in other example GUI embodiments.

Figure 7:
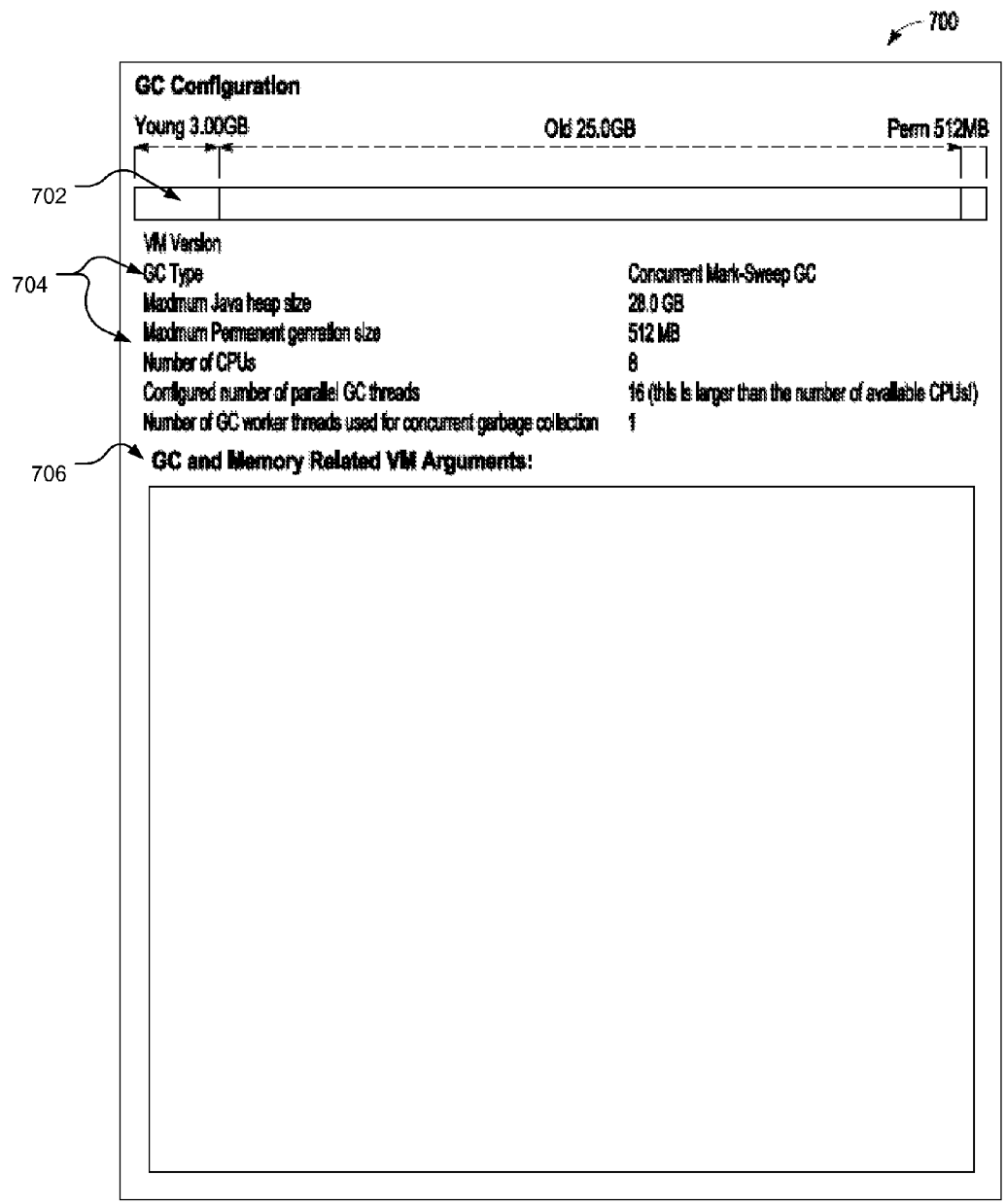
FIG. 7 illustrates another GUI, in accordance with an example embodiment, for analysis of garbage collection processes.

FIG. 7 illustrates another GUI 700, in accordance with an example embodiment, for analysis of garbage collection processes. The GUI 700 may also be generated by the methods 300, 350 and is shown to include garbage collection configuration details which may be similar to information accessible via the garbage collection configuration 530. The example GUI 700 shows a graphical representation 702 of memory usage for the managed memory. In various example embodiments, the GUI 700 graphically illustrate details of certain memory sections, an amount of currently available unused memory, or other such memory information (e.g., of the memory 104 and memory of the processors and memory 216.) A graphical representation 702 particularly shows, by way of example, 3 GB of memory assigned to young generation, 25 GB of memory assigned to an old generation, and 512 MB of memory dedicated to a permanent generation. These young, old, permanent generations may be descriptive titles assigned to portions of a managed memory in certain example embodiments. In other example embodiments, different descriptive titles may be used to describe portions of a memory under management that are treated differently for garbage collection purposes. Further, the sizes of these portions may very from one embodiment to the next. The GUI 700 also includes garbage collection system details 704. The garbage collection system details 704 are shown to include a server version, a garbage collection type, a maximum heap size, a maximum permanent generation size, a number of systems central processing units, a number of configured parallel garbage collection threads, and a number of garbage collection worker threads used for concurrent garbage collection. These may be fixed settings determined by hardware, may be user input settings, or may be settings derived from other system values or combinations of inputs and values. The GUI 700 also includes garbage collection and memory related virtual machine arguments, which may include system settings, settings related to garbage collection and hardware interaction, settings related to garbage collection and firmware/software interaction, and/or any other such information or settings that may be relevant to garbage collection configurations.

In certain alternative embodiments, the GUI 700 may, in conjunction with the presentation of configuration, show flags, and/or hint information associated with flags, present recommendations for configuration settings that may improve system performance.

Figure 8:
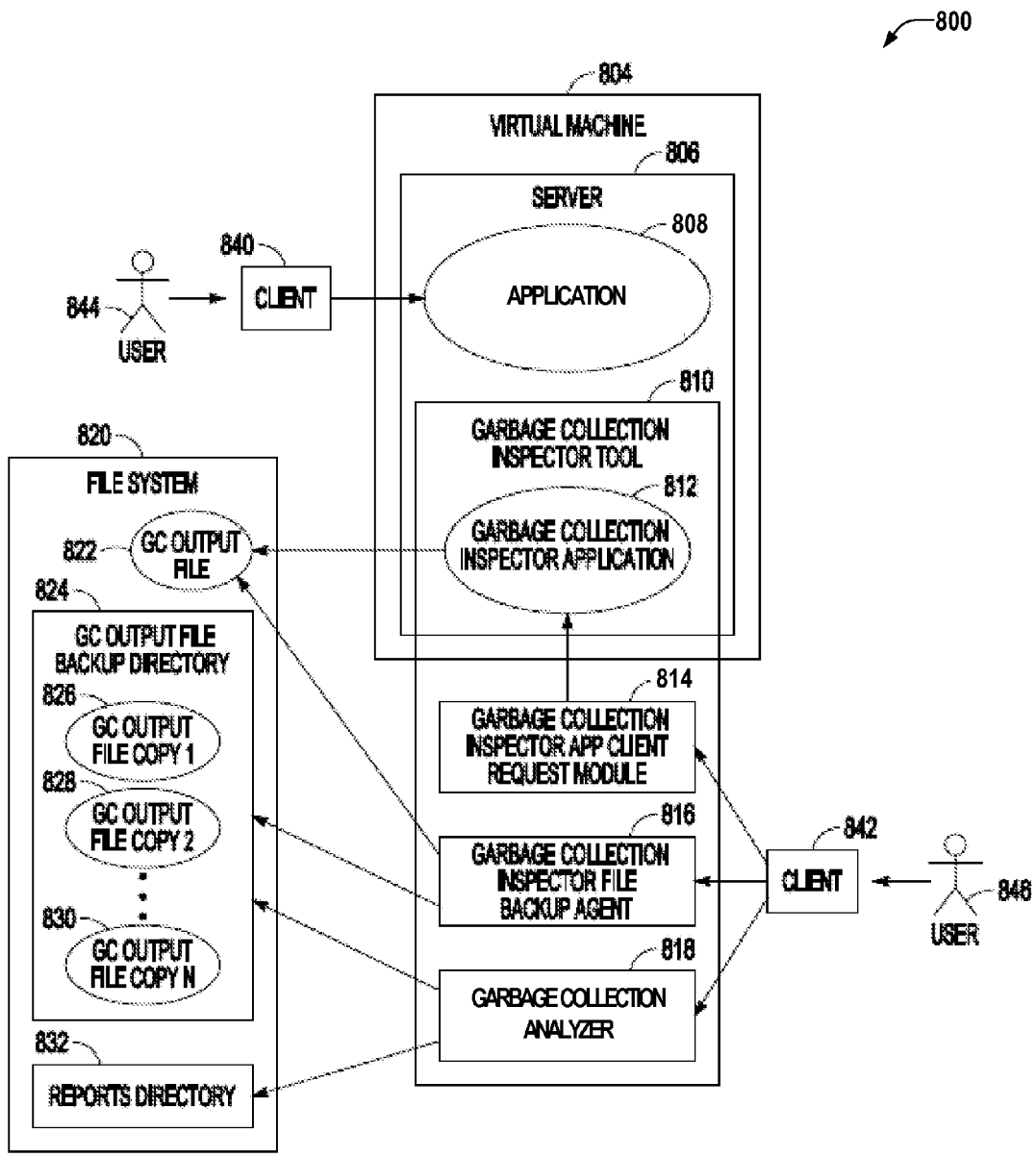
FIG. 8 illustrates a system, in accordance with an example embodiment, including tools and applications to automatically analyze and correct problems during execution of garbage collection processes.

FIG. 8 illustrates a system 800, in accordance with an example embodiment, including tools and applications to automatically analyze and correct problems during execution of garbage collection processes. The system 800 is shown to include a virtual machine (VM) 804, a garbage collection inspector tool 810, a file system 820, and one or more clients 840, 842 associated with users 844 and 846 respectively. The garbage collection inspector tool 810 that may be used to gather garbage collection information, analyze the garbage collection information to flag garbage collection problems, and provide system feedback on the flagged garbage collection problems.

As illustrated, the garbage collection inspector tool 810 may reside wholly or partially at a server 806, such as a Java 2 Platform Enterprise Edition (J2EE) server, which resides at the VM 804. The VM 804 may be a Java Virtual Machine (JVM). The client 842 include one or more clients of a J2EE application 808 that runs at the J2EE server 806. The client 842 may, for example, send a request to run J2EE application 808. The running of the J2EE application 808 may load the J2EE server 806 and provoke various garbage collection actions by the garbage collection processes of the system when the available memory provided by the physical device is running low. Such a garbage collection action may be triggered by a fixed available memory threshold, by a change in the available memory that predicts an out of memory error within a certain time threshold if a garbage collection action is not performed, by a garbage collection request from an application, and/or any other such initiator for a garbage collection process.

When a large computing system enterprise application server, such as the server 806, starts up, there are numerous components that must be loaded. Potentially, the startup of a given computing system could load about 10,000 classes, about 100 services, and about 100,000 methods. Even on a high-powered computing system, such a boot sequence may require many minutes to complete. Once such a large computing system is running, garbage collections may occur at any time, largely based on the memory usage of applications running on the server 806.

In an example embodiment, in order to identify issues with overall system performance and avoid system slowdowns due to problematic garbage collection actions, the garbage collection inspector tool 810 is employed. As illustrated, the garbage collection inspector tool 810 monitors and analyzes a runtime environment (e.g., the VM 804) and captures information from all garbage collection processes therein. This information about the garbage collection processes may be output as a garbage collection output file 822. This may include information about when a garbage collection begins and ends, what the system memory status was before and after the garbage collection action, details of memory objects and references that were impacted by the garbage collection, and other such information. For example, the garbage collection output file 822 may contain class histograms that contain histogram tables containing the relevant information, which, upon analyzing and comparing of the class histograms, shows the user which components (e.g., classes and their associated objects) were using memory prior to the garbage collection action and after the garbage collection action. Next, the garbage collection output file 822 may be placed into a file system 820 and then copied one or more times into a garbage collection output file backup directory 824. The garbage collection output file backup directory is shown to include garbage collection output file copies 826-830, for example, as predetermined and requested by the user. Once each copy 826-830 is made, information in the garbage collection output file 822 is analyzed and compared with garbage collection benchmarks using various calculation techniques described below, resulting in one or more reports to provide an indication of any issues associated with garbage collection processes. The analysis processes used to identify issues with garbage collections may be performed without restarting the system.

In one example embodiment, a garbage collection inspector application 812, such as a J2EE garbage collection inspector application, may be deployed via the garbage collection inspector tool 810 further via the server 806 residing at the VM 804. In the example system 810, the garbage collection inspector application 812 is part of the garbage collection inspector tool 810 and resides at the VM 804. The garbage collection inspector application 812 is shown by way of example to include a lightweight J2EE application. The lightweight J2EE application helps analyze the memory consumption and identify garbage collections and details during operation of the server 806 related to garbage collections without having to restart the corresponding the VM 804 in a special mode. This technique may help maintain the system performance by, for example, avoiding requiring a restart of the VM 804. Accordingly, the system performance may not be compromised, particularly the performance of those systems that are productive. Furthermore, in an example embodiment, no additional hardware is needed to use garbage collection inspector application 812.

In one example embodiment, the garbage collection inspector tool 810 runs at the VM 804 to provide the functionality for requesting the VM 804 to facilitate garbage collection reporting, including presentation, production, and/or printing, of memory operation details including details associated with any portion of the garbage collection output file 822 residing at the file system 820. This may further include basic details of memory usage and application object references from the garbage collection inspector application 812 and a reports directory 832. This may also include analysis details derived from garbage collection information by the garbage collection inspector analyzer 818 (e.g., a histogram analyzer), including garbage collection summary information, statistical information related to garbage collection processes run over a period of time, or class histograms or class histogram tables that contain relevant garbage collection information. This may further include flags identified by the garbage collection analyzer 818 that identify problems with garbage collection processes and/or garbage collection details associated with poor system performance. For example, tables may contain detailed information about the Java memory heap usage, such as (1) the number of objects of a certain Java type are allocated in the memory, (2) the amount of memory that is allocated by a certain object type, (3) a breakdown of overall memory usage by "soft" or "hard" memory reference usage, and/or (4) any other such memory information. The request for garbage collection information (e.g., from the garbage collection inspector file backup agent) from the garbage collection output file 822, any portion of garbage collection output file 822, or any report from the reports directory 832 may be managed by a module, such as a request module 814, which may be part of the garbage collection inspector tool 810. Although, the request module 814 is shown by way of example to be part of garbage collection inspector tool 810, it may or may not reside at the VM 804 and/or the server 806. In other example embodiments, the garbage collection output file 822 may only include data associated with memory system status associated with garbage collections, and other modules such as the garbage collection analyzer 818 may be used to analyze the information from the garbage collection output file 822 to generate output information.

The client 842 may place a request via the request module 814 to have the garbage collection inspector application 812 provide garbage collection output information via the garbage collection output file 822. This request may be made once or multiple times, or done periodically at a predetermined time or time intervals, to continuously produce the garbage collection output file 822 at predetermined time intervals. Alternatively, in response to an initial request from the client 842, the garbage collection inspector application client request module 814 may automatically push garbage collection output information to the client 842 periodically. This may occur following a set number of garbage collection actions, or following a certain number of flags identified by the garbage collection analyzer 818.

In one example embodiment, the garbage collection inspector tool 810 further includes an agent, such as the garbage collection inspector file backup agent 816, which is accessible by the client 842 to request information from the garbage collection output file copies 826-830. As shown by way of example, these garbage collection output file copies 826-830 are provided at the garbage collection output file backup directory (backup directory) 824. Requests by the client 842 can be made once, multiple times, or periodically in accordance with predetermined time intervals. The garbage collection backup directory 820 (including the file copies 826-830) save details (e.g., various memory errors) of the parent garbage collection output file 822. Accordingly, the parent garbage collection output file 822 may be deleted if garbage collection output file 822 is in an embodiment where the analysis system is integrated with the server and memory being managed. In example embodiments, the client 842 can access the agent 816 which, in turn, is operable to set the predetermined time intervals and place a request with file system 820 for the file copies 826-830 of the garbage collection output file 822. These requests can be placed each time a predetermined time interval is reached. The file copies 826-830 can also be automatically requested or made each time an event, including a predetermined event, is triggered. This may be done, for example, each time a new garbage collection output file 822 is requested by garbage collection inspector application 812 via request module 814.

The garbage collection inspector tool 810, in an example embodiment, further includes an analyzer, such as the garbage collection analyzer 818, to generate human-readable reports that provide flag identification analysis results. These human-readable reports may be provided in various formats, such as HTML, XML, and the like. In an example embodiment, when a garbage collection operation occurs, the client 842 may initiate the garbage collection analyzer 818 to operate against the backed up version of garbage collection output file 822 (e.g., against the file copies 826-830). The analyzer 818 may then generate the results in the selected report format and store the report in the reports directory 832. In an example embodiment the reports directory 832 includes HTML reports that include a bytes report, an instances report, and a memory amount report. These reports may be generated based on various types of analyzing techniques that analyze garbage collection information via the garbage collection analyzer 818. Such analyzing techniques may include bytes deviation percentage analysis, instances count deviation percentage analysis, and memory amount usage analysis.

The garbage collection inspector tool 810 is configured, in an example embodiment, to provide profiling of server components and generate garbage collection information without having the need for starting or restarting the virtual machine 804 in any mode. This may also avoid restarting the corresponding servers 806 or other servers thus avoid unnecessary consumption of time and resources.

In an example embodiment, the garbage collection inspector tool 810 can be used without manual interaction. In these circumstances, the garbage collection output file 822 is automatically generated and printed so that it can then analyzed at any convenient time or at any predetermined time or intervals after the run. The garbage collection inspector tool 810 is configured in some example embodiments to be flexible so that it can be deployed or attached to any running productive system without any additional hardware or the need to restart or the need for a change in the system behavior. Once deployed, the garbage collection inspector tool 810 can start monitoring objects and classes responsible for garbage collections, analyze profiling information, generate reports, and continue serving its clients 840, 842.

The garbage collection inspector application 812, the request module 814, the agent 816, and the analyzer 818 may or may not reside at the VM 804 or at the server 806. In an example embodiment, the client 842, although shown as a single client, may represent multiple clients. The clients 840 and 842 include any client computer system that is accessible by users 844, 846. The user may, for example, be a developer, administrator, or any other user requiring garbage collection information. The garbage collection inspector tool 810 may further include a separate monitor or monitoring module to monitor the memory consumption to help produce the amount of data that the users 844, 846. In an example embodiment, the users 844, 846 may need to identify the specific code location within an application that is responsible for a garbage collection, although the monitoring function may be performed by the garbage collection inspector application 812. Similarly, the garbage collection inspector tool 810 may contain an identifier or identification module for identifying the specific code location. For example, the identification function may be performed by the analyzer 818 or even garbage collection inspector application 812. In this example embodiment, classes or specific subsets of classes responsible for garbage collections may be monitored and identified to identify and ideally eliminate the source(s) for such garbage collections.

In one example embodiment, once a class has been shown to be free from flags identified during an analysis, that class may be labeled for indication that the class is free from defects.

As mentioned herein, the example methods 300, 350 may be deployed to manage garbage collection in a VM, such as the VM 804. A VM refers to an abstract machine that includes an instruction set, a set of registers, a stack, a heap, and a method area, such as a machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. For example, a Java source program can be compiled into program code, such as bytecode. Bytecode can be executed on a VM, such as JVM 804, running on any processor or platform. The JVM can either interpret the bytecode one instruction at a time, or the bytecode can be further compiled for the real processor or platform using a just-in-time (JIT) compiler.

In the illustrated embodiment, for simplicity, the JVM 804 is used as an example; however, other examples of VMs, which can be used in various embodiments, include Advanced Business Application Programming (ABAP) language VMs, Common Language Runtime (CLR) VMs, and the like. ABAP is a programming language for developing applications for SAP systems, such as SAP R/3 system, which is a widely installed business application system developed by SAP AG of Walldorf, Germany. The CLR is a managed code execution environment developed by Microsoft Corp. of Redmond, Wash. For purposes of simplicity, the discussion in this document focuses on virtual machines, and in particular JVM 804, but it is to be understood that the techniques described herein can also be used with other types of runtime systems.

A runtime system includes a code execution environment that executes instructions or code in user requests and that provides runtime services for that code. Code runtime services may include functionality, such as process, thread, and memory management (e.g., laying out objects in the server memory, sharing objects, managing references to objects, and garbage collecting objects). Enhanced runtime services may include functionality, such as error handling and establishing security and connectivity.

Processes taught by the discussion above may be performed with program code, such as machine-executable instructions, which can cause a machine (such as a virtual machine, a general-purpose processor disposed on a semiconductor chip, a special-purpose processor disposed on a semiconductor chip, etc.) to perform certain functions. Alternatively, these functions may be performed by specific hardware components that contain hardwired logic for performing the functions or by any combination of programmed computer components and custom hardware components.

One or more modules within or associated with a garbage collection inspector tool (e.g., the garbage collection inspector tool 810 of FIG. 8) may include hardware, software, and a combination thereof. In a case where a module includes software, the software data, instructions, and/or configuration may be provided via an article of manufacture by a machine/electronic device/hardware. An article of manufacture may include a machine accessible/readable medium having content to provide instructions, data, and the like. The content may result in an electronic device, for example, a filer, a disk, or a disk controller as described herein, performing various operations or executions described. A machine accessible medium includes any mechanism that provides (e.g., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), and the like. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 9:
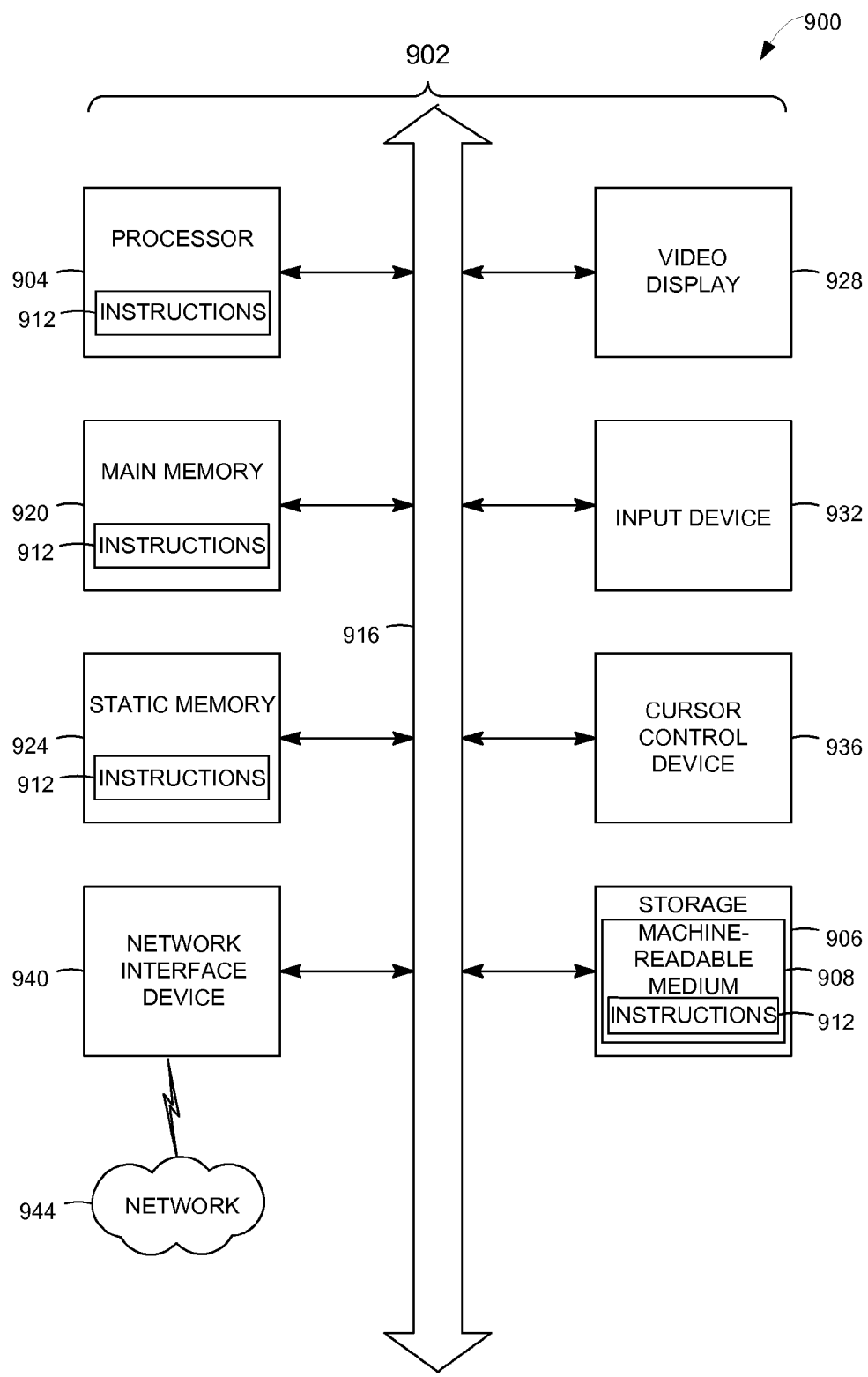
FIG. 9 illustrates a block diagram of a computer processing system within which a set of instructions, for causing the computer to perform any one or more of the methodologies discussed herein, may be executed.

FIG. 9 is a block diagram of a machine 902 in the example form of a computer system 900, according to various embodiments. The computer system 900 may include a set of instructions 912 for causing the computer system 900 to perform any one or more of the activities discussed herein.

In FIG. 9, it can be seen that the components of the machine 902 may include processor 904, main memory 920, static or non-volatile memory 924, and mass storage device 906. Other components coupled to the processor 904 may include an output device 928, such as a video display, an input device 932, such as a keyboard, and a cursor control device 936, such as a mouse. A network interface device 940 to couple the processor 904 and other components to a network 944 may also be coupled to a bus 916.

The processor 904, the memories 920, 924, and the storage device 906 may each include instructions 912 which, when executed, cause the machine 902 to perform any one or more of the methods described herein. The instructions 912 may further be transmitted or received over the network 944 via the network interface device 940 utilizing any one of a number of well-known transfer protocols (e.g., HTTP). Any of these elements coupled to the bus 916 may be absent, present singly, or present in plural numbers, depending on the specific embodiment to be realized.

The embodiment of FIG. 9 shows a single processor 904. In other embodiments, any number of processors may be used. A processor as described herein refers to hardware system that includes logic structures capable of executing instructions to perform calculations described by the instructions. This may include an integrated circuit microprocessor such as an application specific integrated circuit (ASIC), and application specific instruction set processor (ASIP) a multi-core processor with independent processing cores as part of a single processing component, or any other such physical device that may be used to implement a processing unit. In certain embodiments, a processor may be integrated with processor registers which function as memory for the integrated circuit, and is separate from other memory in a computing system. Further, embodiments may include multiple different types of processors with special purpose structure designed for the specific application associated with the processor.

In some embodiments, the machine 902 operates as a standalone device or may be connected (e.g., networked) to other machines. In a networked environment, the machine 902 may operate in the capacity of a node, such as a server or a client device in server-client network environment, or as a peer machine in a peer-to-peer (or distributed) network environment. The machine 902 may comprise a personal computer (PC), a tablet PC, a set-top box (STB), a personal data assistant device, a cellular telephone, a web appliance, a network router, switch or bridge, or any machine capable of executing a set of instructions (sequential or otherwise) that specify actions to be taken by that machine. Further, while only a single machine 902 is illustrated, the term "machine" shall also be taken to include any collection of machines that individually or jointly execute a set (or multiple sets) of instructions to perform any one or more of the methodologies discussed herein.

While the machine-readable medium 908 is shown as a single medium, the term "machine-readable medium" should be taken to include a single medium or multiple media (e.g., a centralized or distributed database, and/or associated caches and servers, and or a variety of storage media, such as the processor 904 registers, memories 920, 924, and the storage device 906) that store the one or more sets of instructions 912. The term "machine-readable medium" shall also be taken to include any medium that is capable of storing, encoding or carrying a set of instructions for execution by the machine and that cause the machine 902 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Certain applications or processes are described herein as including a number of modules. A "module" is a unit of distinct functionality that can provide information to, and receive information from, other modules. Accordingly, the described modules may be regarded as being communicatively coupled. Modules may also initiate communication with input or output devices and can operate on a collection of information. Modules may include hardware circuitry, optical components, single or multi-processor circuits, memory circuits, software program modules and objects, firmware, and combinations thereof, as appropriate for particular implementations of various embodiments. The term "module" may include an identifiable portion of code, data, or computational object, such as a document application, designed to achieve a particular function, operation, processing, or procedure.

It should be noted that references to "an" or "one" embodiment in this disclosure are not necessarily to the same embodiment, and such references mean at least one. Embodiments can be implemented in a variety of architectural platforms, operating and server systems, devices, systems, or applications. Any particular architectural layout or implementation presented herein is thus provided for purposes of illustration and comprehension only, and is not intended to limit the various embodiments.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:
automatically executing a garbage collection process as part of automated memory management for a memory of a server system;
automatically gathering, using at least one processor of the server, garbage collection information associated with the garbage collection process and storing the garbage collection information in a garbage collection output file of a file system, wherein the garbage collection information comprises at least a status of the memory before and after the garbage collection process, a list of one or more memory requests received by the memory prior to the garbage collection action, and runtime details of the garbage collection action; and
analyzing the garbage collection output file to identify a plurality of flags associated with a performance of the server system that does not meet a predetermined threshold, wherein a first flag of the plurality of flags is associated with a first portion of the garbage collection information, and wherein a second flag of the plurality of flags is associated with a second portion of the garbage collection information that is different from the first portion of the garbage collection information,
wherein the first flag is based on a determination that a first working time associated with the garbage collection process is different from a first elapsed time associated with the garbage collection process by more than a threshold amount, wherein the threshold amount is dynamically determined based on an operating system page fault counter associated with memory swapping.

2. The method of claim 1, wherein automatically gathering garbage collection information associated with the garbage collection process is performed by a Java 2 Enterprise Edition (J2EE) application operating on a computing device.

3. The method of claim 1, wherein the garbage collection information comprises a total processing time and a processing time associated with garbage collection; and
wherein analyzing the garbage collection output file to generate garbage collection flags comprises calculating a ratio of the processing time associated with garbage collection and the total processing time.

4. The method of claim 3, wherein the second flag is generated when the ratio of the processing time associated with garbage collection and the total processing time is greater than 1:2.

5. The method of claim 1, wherein the garbage collection information comprises a running time for the garbage collection process; and
wherein the second flag is generated when the running time for the garbage collection processes is greater than a threshold time.

6. The method of claim 5, wherein the second flag is further generated based on a running time for a first phase of a plurality of phases of the garbage collection process.

7. The method of claim 1, wherein analyzing the garbage collection output file to generate garbage collection flags comprises identifying a memory shortage by analyzing the garbage collection information to identify consecutive garbage collection processes that clear all soft references in the memory.

8. The method of claim 1, wherein analyzing the garbage collection output file to generate garbage collection flags comprises identifying one or more of:
configuration parameters specified multiple times with different values;
configuration memory region sizes that exceed a physically available memory;
configuration values for a number of parallel garbage collection threads that exceed the number of available processing unit cores; or
configuration parameters that are not relevant for the enabled garbage collection algorithm on systems with multiple available garbage collection implementations.

9. The method of claim 1, further comprising measuring a first value of a first performance metric associated with the performance of the server system; and
identifying an original state of a garbage collection configuration value associated with the performance metric;
automatically adjusting the garbage collection configuration value to an updated state in response to identification of the flags associated with poor server performance;
automatically gathering second garbage collection information associated with the garbage collection process for additional garbage collection processes occurring after the adjusting of the garbage collection configuration value;
analyzing the second garbage collection information to identify a second value for the first garbage collection metric; and
returning the garbage collection configuration value to the original state after determining that a first server performance associated with the first value of the first performance metric is superior to a second server performance associated with the second value of the first performance metric.

10. A server system comprising:
an automatic garbage collection module that automatically, using one or more hardware processors, executes a plurality of garbage collection processes to manage usage of the memory by one or more applications;
a garbage collection monitoring module that gathers garbage collection information for each garbage collection process and stores the garbage collection information in a garbage collection output file of a file system; and
a garbage collection analysis module that analyzes the garbage collection output file to generate garbage collection flags associated with system performance that is below a predetermined threshold,
wherein analyzing the garbage collection output file to generate garbage collection flags comprises generating a first flag based on a determination that a first working time associated with a first garbage collection process is different from a first elapsed time associated with the first garbage collection process by more than a threshold amount, wherein the threshold amount is dynamically determined based on an operating system page fault counter associated with memory swapping.

11. The server system of claim 10, wherein analyzing the garbage collection output file to generate garbage collection flags further comprises determining a percentage of an analyzed operating time when concurrent garbage collection processes are active, and generating a second flag when a percentage of operating time when concurrent garbage collection processes are active is at or above a threshold percentage.

12. The server system of claim 11, wherein the percentage of the analyzed operating time when concurrent garbage collection processes are active is 100%.

13. The server system of claim 10, wherein analyzing the garbage collection output file to generate garbage collection flags further comprises determining that a second garbage collection process was triggered based on a promotion failure where a first memory generation is sufficiently fragmented to prevent promotion of a memory object to the first memory generation from a second memory generation.

14. The server system of claim 10, wherein analyzing the garbage collection output file to generate garbage collection flags further comprises determining that one or more garbage collection processes were interrupted prior to completion.

15. The server system of claim 10, wherein analyzing the garbage collection output file to generate garbage collection flags further comprises determining that an average number of runnable threads during an analyzed time period is greater than an available number of central processing unit cores.

16. A non-transitory computer readable storage medium embodying instructions that, when executed by a processor, perform operations comprising:

automatically executing a garbage collection process as part of automated memory management for a memory of a server system;

automatically gathering, using at least one processor of the server, garbage collection information associated with the garbage collection process and storing the garbage collection information in a garbage collection output file of a file system, wherein the garbage collection information comprises at least a status of the memory before and after the garbage collection process, a list of one or more memory requests received by the memory prior to the garbage collection action, and runtime details of the garbage collection action; and analyzing the garbage collection output file to identify a plurality of flags associated with a performance of the server system that does not meet a predetermined threshold, wherein a first flag of the plurality of flags is associated with a first portion of the garbage collection information, and wherein a second flag of the plurality of flags is associated with a second portion of the garbage collection information that is different from the first portion of the garbage collection information, wherein the first flag is based on a determination that a first working time associated with the garbage collection process is different from a first elapsed time associated with the garbage collection process by more than a threshold amount, wherein the threshold amount is dynamically determined based on an operating system page fault counter associated with memory swapping.

17. The non-transitory computer readable medium of claim 16, wherein the garbage collection information comprises a running time for the garbage collection process;

wherein the second flag is generated when the running time for the garbage collection process is greater than a threshold time; and wherein the second flag is further generated based on a running time for a first phase of a plurality of phases of the garbage collection process.

18. The non-transitory computer readable medium of claim 16, wherein analyzing the garbage collection output file to generate garbage collection flags comprises identifying two or more of:

configuration parameters specified multiple times with different values;

configuration memory region sizes that exceed a physically available memory;

configuration values for a number of parallel garbage collection threads that exceed the number of available processing unit cores; or configuration parameters that are not relevant for the enabled garbage collection algorithm on systems with multiple available garbage collection implementations.

* * * * *